United States Patent [19]

Amaral

[11] Patent Number: 4,852,534
[45] Date of Patent: Aug. 1, 1989

[54] OIL RESTRICTOR SYSTEM

[76] Inventor: David C. Amaral, 9306 Sheridan St., Lanham, Md. 20706

[21] Appl. No.: 209,298

[22] Filed: Jun. 21, 1988

[51] Int. Cl.⁴ ............................................... F01M 1/00
[52] U.S. Cl. .................................... 123/196 R; 184/6.5
[58] Field of Search ..................... 123/196 R, 196 CP; 184/6.5; 138/40, 44, 45

[56] References Cited

U.S. PATENT DOCUMENTS

| | | | |
|---|---|---|---|
| 2,907,411 | 10/1959 | Leach | 123/196 R |
| 2,955,675 | 10/1960 | Leach | 123/196 R |
| 2,988,081 | 6/1961 | Etchells et al. | 123/196 R |
| 3,014,554 | 12/1961 | Etchells et al. | 123/196 R |
| 3,837,433 | 9/1974 | Combs, Jr. et al. | 123/196 CP |
| 3,965,880 | 6/1976 | Michael | 123/196 R |
| 4,094,382 | 6/1978 | Lee | 123/196 CP |

Primary Examiner—E. Rollins Cross
Attorney, Agent, or Firm—Morton J. Rosenberg

[57] ABSTRACT

An oil flow restrictor system (100) is provided for increasing the oil pressure to the main bearings of a V-block engine internal combustion engine (10) while simultaneously restricting the flow of oil independently to the left lifter oil gallery (18) and the right lifter oil gallery (16), both of which supply oil to the upper portions of their respective sides of engine (10). Oil restrictor system (100) includes a tubular body (110) having an inlet chamber (140). Oil flow is provided from inlet chamber (140) to axial outlet (154) through oil restricting orifice (130). Simultaneously oil flow is provided to the transverse outlet, provided by annular slot (116) through transverse flow restricting orifice (119), formed in annular wall (111) of tubular body )110). Each of the orifices (119 and 130) may have substantially equal cross-sectional flow areas so as to equally restrict oil flow to the left and right upper portions of engine (10). Alternatively, the cross-sectional flow area of one of the orifices (119 and 130) may be made smaller than the other to provide a greater oil flow restriction to one side of engine (10) than the other.

10 Claims, 2 Drawing Sheets

OIL RESTRICTOR SYSTEM

BACKGROUND OF THE INVENTION

1. Filed of the Invention

This invention directs itself to oil flow restrictor systems for use in an internal combustion engine. In particular, this invention directs itself to an oil flow restrictor having a means for independently restricting fluid flow in two substantially orthogonal directions. Still further, this invention directs itself to an oil flow restrictor having a tubular housing member adapted for insert into an oil passage of an internal combustion engine. More in particular, this invention directs itself to an oil flow restrictor having a pair of orifices for independently restricting the oil flow in both an axial direction and a transverse direction. Further, this invention directs itself to an oil restrictor having a unitary structure wherein an inlet chamber is fluidly coupled to both the axial flow restricting orifice and the transverse flow restricting orifice. Still further, this invention directs itself to an oil restrictor system which includes a transverse fluid outlet defined by an annular slot formed in the sidewall of the tubular housing member.

2. Prior Art

Fluid flow restriction systems are well-known in the art. The best known prior art to the Applicant includes U.S. Pat. Nos. 2,612,150; 2,713,336; 2,842,962; 3,354,966; 3,733,902; 3,778,039; 3,921,672; 3,965,880; 4,234,008; and, 4,334,554.

Some prior art systems such as that shown in U.S. Pat. Nos. 4,234,008 and 3,921,672 are directed to fluid chokes for controlling a fluid flow in a single axial direction. While these systems have orifices extending through the annular sidewalls of the choke bodies, these orifices form inlet passages for restricting the fluid flow only in a singular axial direction. Such systems could be employed for restricting oil flow in an internal combustion engine, but they must be located in an oil passage which supplies oil flow to both the left and right upper portions of the internal combustion engine. However, when these prior art systems are applied to internal combustion engines in this fashion they do not permit the control of oil flow to both the left and right upper portions of the engine to be independent of one another, as the single axial restriction controls the fluid flow to both sides of the engine simultaneously. Therefore, such prior art systems cannot compensate for externally applied forces which effect the fluid flow, such as centrifugal force generated when the vehicle traverses an oval track in a single direction at a high rate of speed. In contradistinction, the present invention overcomes this problem by incorporating a pair of orifices to independently restrict the fluid flow in two orthogonal directions, allowing the cross-sectional flow area of each orifice to be a predetermined size to compensate for centrifugal forces which are expected to be applied to the internal combustion engine. In other applications, both orifices may be equally sized to provide substantially equal oil restricted oil flow to both the left and right upper portions of a V-block internal combustion engine.

In other prior art systems, such as U.S. Pat. No. 3,354,996, there are provided fluid flow restriction devices intended for insert into a fluid flow conduit or passage. However, such devices require 0-ring seals for sealing the passage and restraining movement of the restrictor. While these devices may include a plurality of input and output ports extending through the tubular body wall, they still can only provide independently controlled fluid flow restriction in a singular direction. Whereas, the present invention has the advantage of independently controlling a fluid flow in two substantially orthogonal directions.

SUMMARY OF THE INVENTION

A fluid flow restrictor system for increasing oil pressure in one portion of an internal combustion engine while simultaneously reducing the oil flow to a second and third portion of the engine. The fluid oil restrictor system comprises a longitudinally extended restrictor member having a central bore extending in a longitudinal direction, surrounded by an annular sidewall. The tubular member further includes a pair of orifices for independently controlling the oil flow in two substantially orthogonal directions.

DESCRIPTION OF THE PREFERRED EMBODIMENTS

Referring now to FIGS. 1-4, there is shown the oil restrictor system 100 for increasing oil pressure in the lower portion of engine 10 and simultaneously reducing the oil flow to the upper left and right portions of the V-block engine 10. As will be seen in following paragraphs, oil flow restrictor system 100 is specifically directed to the concept of independently controlling the oil flow to the left and right upper portions of the V-block engine 10 by separately restricting oil flow in both an axial direction and a transverse direction. Additionally, oil restrictor system 100 provides a simple means to apportion the oil flow within a V-block engine, having a unitary structure which is easy to install, low cost, and does not require machining of the engine to accommodate the restrictor.

Figure 1:
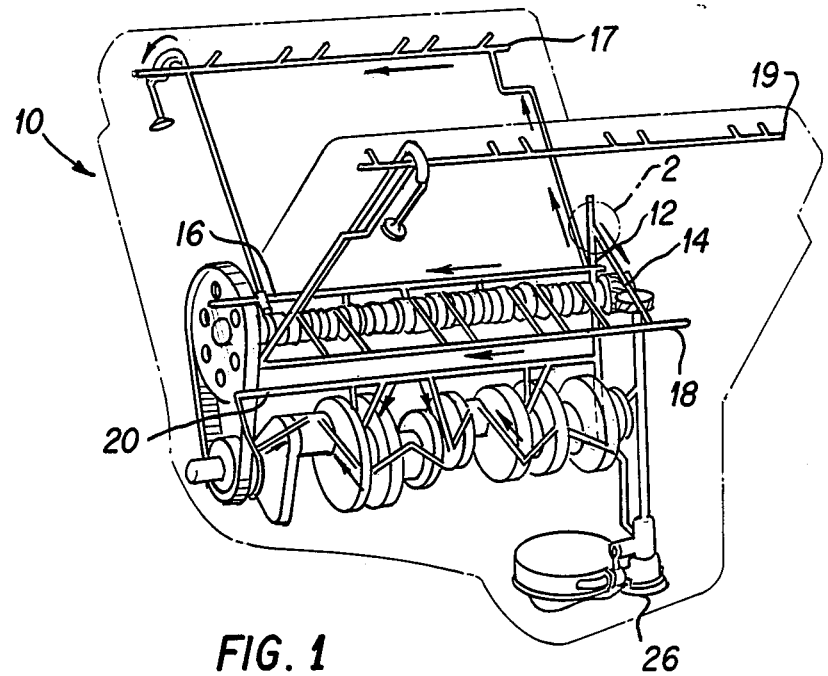
FIG. 1 is a perspective partially diagrammatic view of an internal combustion engine lubrication system.

Oil restrictor system 100 is intended for installation within the lubrication system of a V-block engine 10, shown in FIG. 1. The oil pump 26 provides a pressurized oil flow to engine 10 through a plurality of passages and galleries formed in the engine block. Oil pup 26 provides oil flow to the main bearing gallery 20 which distributes oil to the main bearings of the crankshaft. Oil is distributed to both the upper left and upper right portions of the V-block engine 10 through the vertical oil passage 12. Vertical oil passage 12 couples the oil flow from the main bearing gallery, or header, 20 to the right lifter oil gallery 16 and intersecting oil passage 14. Intersecting oil passage 14 carries the oil flow to the left lifter oil gallery 19. As shown in FIG. 1, the right lifter oil gallery 16 is coupled by an oil passage to the right rocker arm oil gallery 17, while the left lifter gallery is coupled through an oil passage to the right rocker arm oil gallery 19. Thus, it can be seen that the oil supply is distributed to the engine's main bearings from the main bearing gallery 20, and from which the oil distribution to both the upper left and upper right portions receive their oil supply by way of vertical oil passage 12.

Obviously, vertical oil passage 12 is an ideal location to introduce a fluid flow restrictor to raise the oil pressure, and consequently the oil flow, to the main bearings while simultaneously restricting the oil flow to the upper portions of the engine where less oil is required. A singular axial flow restrictor could be secured within the vertical oil passage 12 and simultaneously restrict the flow of oil to both the left and right lifter oil galleries 18 and 16, respectively. However, this method of flow restriction does not permit the independent control of the oil flow to each of the lifter oil galleries 18 and 16. This is especially evident when a racing vehicle is to be driven around an oval track in a particular direction, without independent control of the oil flow to each side of the engine. Centrifugal forces cause oversupply of oil to one side of the engine and undersupply to the opposing side. This problem could be overcome by the use of two separate flow restrictors, one for each side of the engine to separately restrict the oil flow to the upper left and right portions of the engine. However, this solution is very difficult to install, and very expensive. Whereas, the instant invention provides the means to independently restrict the flow of oil to both the left and right upper portions of the engine with a unitary device which is low cost and easily installed.

Figure 4:
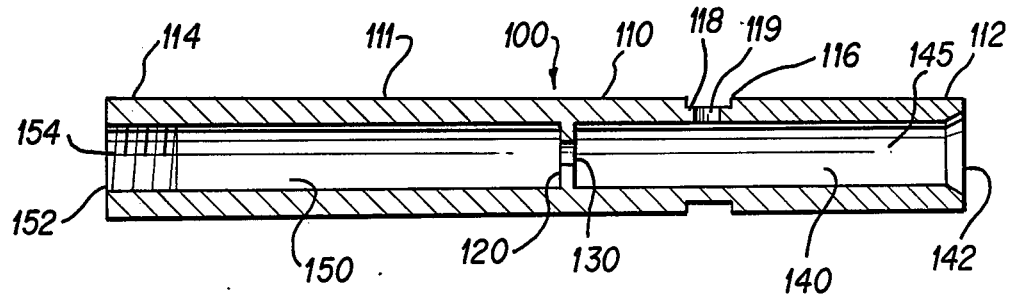
FIG. 4 is a cross-sectional view of the oil restrictor system.

Referring now to FIG. 4, there is shown the oil flow restrictor system 100 having a longitudinally extended tubular body 110. The tubular body 110 includes an annular wall 111 which surrounds a central bore 145. The annular wall 111 has an outside diameter which tapers slightly from second end 114, where it is at a maximum diameter, to a point in the vicinity of partition 120, where it is at a minimum diameter. The difference in diameter between second end 114 and the diameter at partition 120 has an approximate range of 0.003–0.009 inches. This slight taper enables the oil flow restrictor system 100 to provide a tight press fit engagement with the inner walls of vertical oil passage 12. The outer diameter between partition 120 and first end 112 is substantially constant. This constant diameter allows for effective sealing of the insert passageway and obviates use of O-rings to seal the passage.

As stated, oil flow restrictor system 100 further includes partition 120 located intermediate first end 112 and second end 114. Partition 120 forms an inlet chamber 140 defined by that portion of the central bore 145 which extends from inlet 142 at first end 112 to partition 120. Partition 120 includes an orifice 130 formed therein, creating an axial flow restriction. Partition 120 further forms an outlet chamber 150 defined by that portion of the central bore 145 which extends from partition 120 to axial outlet 152 at second end 114 of the tubular body 110.

The oil restrictor system 100 also includes a transverse outlet defined by the annular slot 116 formed in the sidewall 111 of the tubular body 110. Annular slot 116 includes a bottom surface 118 in which is formed an orifice 119, which extends from the annular slot 116 through wall 111 into the inlet chamber 140. Thus, orifice 119 provides oil flow restriction in the transverse direction, independently of orifice 130 which provides oil flow restriction in the axial direction.

Therefore, when oil flow restriction system 100 is installed within the V-block engine 10, oil enters oil restriction system 100 at inlet 142 filling the inlet chamber 140 with oil, creating a reservoir. Orifice 130 being in fluid communication with inlet chamber 140, provides a restricted oil flow therethrough to outlet 152 by way of outlet chamber 150, for supplying oil to the upper left portions of the engine. Orifice 119 being in fluid communication with inlet chamber 140 provides restricted oil flow therethrough to annular slot 116, providing the transverse outlet for supplying oil to the upper right portions of the engine, as will be seen in following paragraphs.

Figure 2:
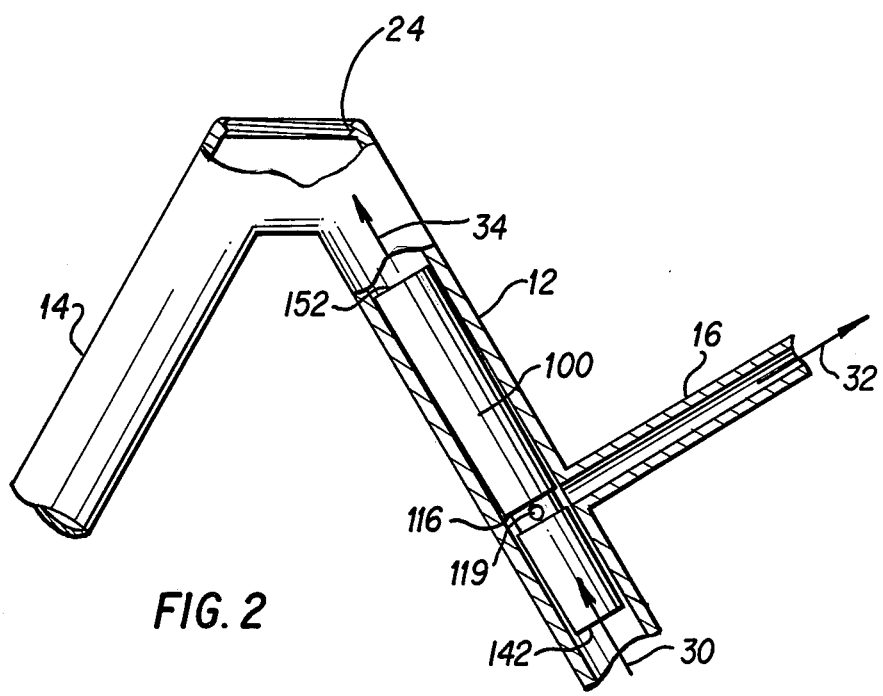
FIG. 2 is an enlarged fragmented partial vertical section of a portion of FIG. 1.
Figure 3:
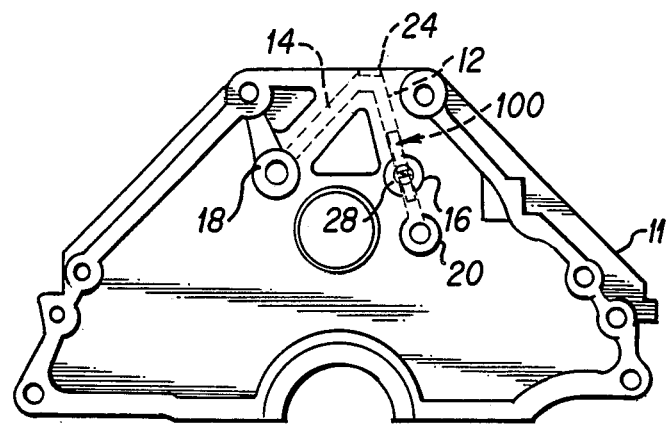
FIG. 3 is a plane view of the rear of an internal combustion engine block.

Referring now to FIGS. 2 and 3, there is shown oil restriction system 100 installed within V-block engine 10. Oil restriction system 100 is installed through access opening 24 located at the top of the engine block 11, and opening into the oil passage defined by the intersection of vertical oil passage 12 and intersecting oil passage 14. Oil restriction system 100 is pressed into the vertical oil passage 12 from access opening 24 such that the annular slot 116 is in alignment with the right lifter oil gallery 16. There is no requirement for orifice 119 to be directed toward right lifter oil gallery 16, since the annular slot 116 provides an oil passage from orifice 119 to right lifter oil gallery 16 regardless of the orientation of orifice 119.

Oil from the main bearing oil gallery 20 flows through vertical oil passage 12, entering oil restrictor system 100 an inlet 142 as indicated by direction arrow 30. The right upper portion of the engine is provided with restricted oil flow through orifice 119 which is fluidly coupled to right lifter oil gallery 16 by the annular slot 116, providing oil flow through right lifter oil gallery 16 as indicated by direction arrow 32. Simultaneously, restricted oil flow is provided outlet in the axial direction by orifice 130 through 152, as indicated by direction arrow 34. This axial flow passes from vertical oil passage 12 to intersecting oil passage 14, providing the restricted oil flow to left lifter oil gallery 18. As shown in FIG. 1, both left and right lifter oil galleries 18 and 16 respectively, are coupled to respective left and right rocker arm oil galleries 19 and 17. Thus, oil restrictor system 100 has the effect of increasing the oil pressure on the inlet side of the orifices 119 and 130, increasing the oil pressure to the main bearing oil gallery and the flow therethrough. In addition, the oil flow to both the left and right upper portions of the engine are independently restricted by separate orifices 119 and 130 formed in the unitary body 110 of oil restrictor system 100.

Oil restrictor system 100 is easily installed in engine block 11 by insertion through access opening 24 and pressing oil restriction system 100 into position within vertical oil passage 12. The proper positioning of oil restrictor system 100 is easily determined by removing the freeze plug from freeze plug opening 28, providing access to right lifter oil gallery 16, and allows observation of the intersection of oil gallery 16 and vertical oil passage 12, to determine when the annular slot 116 is centered therein. To facilitate the installation and removal of oil restrictor system 100, threads are formed internal to bore 145 at second end 114 of tubular body 110, as shown in FIG. 4. Thus, a slide hammer may be threadedly engaged with restriction system 100 when it is required to remove the oil restrictor. The press fit engagement of the tubular body 110 with the sidewalls of vertical oil passage 12 is facilitated by the slight tapering contour of the outer surface of tubular body 110. The slight taper is defined by a change in diameter over the length of tubular body 110 having an approximate range of 0.003–0.009 inch.

As has been previously described, oil flow to the main bearings of V-block engine 10 is increased, by increasing the oil pressure in the main bearing oil gallery 20. Oil flow from main gallery 20 through vertical oil passage 12 to inlet 142 of the oil restrictor body 110 enters inlet chamber 140. Each of orifices 130 and 119 independently restrict the flow of oil in both the axial and transverse directions respectively. Orifices 130 and 119 are typically substantially equal in size, so as to provide nearly equal oil restriction to both the left and right upper portions of the engine. However, in cases where a vehicle will be exposed to centrifugal forces which would tend to unbalance the oil flow to one side of the engine with respect to the other, orifices 119 and 130 may be sized to compensate for these centrifugal forces. Thus, one of the orifices 130 or 119 may be made smaller, providing independent oil flow restriction to the upper portion of the engine served by the particular orifice.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A fluid flow restrictor system for (1) increasing oil pressure in one portion of an internal combustion engine and (2) simultaneously reducing the oil flow to a second and third portion of said engine, comprising:
a longitudinally extended restrictor member having a central bore extending in said longitudinal direction, said fluid flow restrictor system including means for independently controlling the oil flow to each of said second and third portions of said engine, said restrictor member including an annular sidewall surrounding said central bore.

2. The fluid flow restrictor system as recited in claim 1 wherein said restrictor member is inserted within an oil passage formed intermediate said first portion of said internal combustion engine and said second and third portions.

3. The fluid flow restrictor system as recited in claim 2 wherein said restrictor member is in friction fit engagement with said oil passage, said oil passage providing fluid coupling between a main bearing oil gallery and at least two lifter oil galleries.

4. The fluid flow restrictor system as recited in claim 2 wherein said restrictor member has a substantially cylindrical contour tapering from one end of said restrictor member to an intermediate section of said restrictor member.

5. The fluid flow restrictor system as recited in claim 4 wherein said taper is defined by a diameter dimension which changes from one of said ends to said intermediate section by a dimension having an approximating range of 0.003 to 0.009 inches.

6. The fluid flow restrictor system as recited in claim 1 wherein said means for independently controlling the oil flow includes a pair of orifices, each independently controlling said oil flow to one of said second or third portions of said internal combustion engine.

7. The fluid flow restrictor system as recited in claim 6 wherein one of said orifices is positioned within said central bore of said restrictor member, said orifice dividing said central bore into an inlet section and an outlet section.

8. The fluid flow restrictor system as recited in claim 7 wherein the other of said orifices is formed in said annular sidewall and extends from said inlet section to an annular outlet passage formed in said annular sidewall.

9. The fluid flow restrictor system as recited in claim 6 wherein each of said orifices have substantially equal cross-sectional flow areas so as to equally restrict said oil flow to each of said second and third portions of said internal combustion engine.

10. The fluid flow restrictor system as recited in claim 6 wherein one of said orifices has a cross-sectional flow area less than the other of said orifices to restrict said oil flow to one of said second or third portions of said internal combustion engine to a greater amount than said oil flow to the other of said portions of said internal combustion engine.

* * * * *